(12) United States Patent
Schlesener et al.

(10) Patent No.: US 7,085,132 B2
(45) Date of Patent: Aug. 1, 2006

(54) VERTICALLY DOCKING AN INFORMATION HANDLING SYSTEM TO A MEDIA SLICE

(75) Inventors: Maria Schlesener, Pflugerville, TX (US); Jeffrey Godsted, Round Rock, TX (US); Philip Gold, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/720,713

(22) Filed: Nov. 24, 2003

(65) Prior Publication Data

US 2005/0111181 A1 May 26, 2005

(51) Int. Cl.
*G06F 1/16* (2006.01)
(52) U.S. Cl. .................. 361/686; 710/303; 710/304
(58) Field of Classification Search ........ 361/683–686, 361/725, 726, 732, 740, 747, 754, 798, 801; 710/303, 304; D14/107
See application file for complete search history.

(56) References Cited

U.S. PATENT DOCUMENTS

| | | | |
|---|---|---|---|
| 5,311,397 A * | 5/1994 | Harshberger et al. | 361/683 |
| 5,684,673 A * | 11/1997 | Shibasaki et al. | 361/686 |
| 6,061,233 A | 5/2000 | Jung | |
| 6,119,184 A * | 9/2000 | Takahama | 710/303 |
| 6,392,383 B1 * | 5/2002 | Takimoto et al. | 320/115 |
| 6,426,872 B1 * | 7/2002 | Sutton et al. | 361/686 |
| 6,556,436 B1 * | 4/2003 | Ohnishi | 361/686 |
| 6,570,758 B1 * | 5/2003 | Maeda | 361/686 |
| 6,687,123 B1 * | 2/2004 | Kitahara | 361/695 |
| 2004/0075980 A1 * | 4/2004 | Park | 361/686 |

\* cited by examiner

*Primary Examiner*—Lynn Feild
*Assistant Examiner*—Anthony Q. Edwards
(74) *Attorney, Agent, or Firm*—Haynes and Boone, LLP

(57) ABSTRACT

A media slice includes a guide member and a docking surface with locating members, locking members and a first connector. A cavity in the media slice is open to the docking surface. An information handling system includes locating member receivers and a second connector. The information handling system is docked in the media slice by using the guide member and locating members to align the information handling system above the media slice. The locating members engage the locating member receivers and hold the information handling system parallel to the docking surface. With the locating members and locating member receivers engaged, the information handling system may be lowered onto the media slice, allowing the first connector and second connector to be mated and the locking members to lock the information handling system to the media slice. A battery may be stored in the cavity to be locked into the information handling system/media slice combination.

18 Claims, 3 Drawing Sheets

VERTICALLY DOCKING AN INFORMATION HANDLING SYSTEM TO A MEDIA SLICE

BACKGROUND

The present disclosure relates generally to information handling systems, and more particularly to a media slice used with an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A media slice is a very useful component of an information handling system (IHS), comprising a mobile docking station that provides additional power supplies for the IHS, and provides additional media bays and input-output connectors when the IHS is docked. When an IHS is being docked in a media slice, a user must position the IHS on an angle while aligning the docking features of the IHS to corresponding features on the media slice. With the IHS in this angular position, the user's ability to reference the alignment and locking features between the IHS and docking station may be hampered, which can result in damage to the IHS and media slice. Conversely, when the IHS is being undocked from the media slice, a user must position the IHS on an angle to release the IHS from the docking features on the media slice. Releasing the IHS from the media slice in this angular position again risks damage to the IHS and media slice.

One way the media slice can provide additional power supplies to the IHS is by storing and charging a second battery. It is desirable, once the battery is placed into the media slice, to be able to secure the battery in the docked IHS/media slice combination. Present methods of securing the battery include single locking members or multiple locking members oriented in the same direction which can be unlocked by sliding a device between the IHS and the media slice and pushing the locking members into an unlocked position, enabling the IHS to be lifted off the media slice and allowing access to the battery.

Accordingly, it would be desirable to provide method for improved docking of an information handling system absent the disadvantages found in the prior methods discussed above.

SUMMARY

According to one embodiment, a vertical docking apparatus is provided which allows an docking member to be docked without having to position it at an angle to engage or disengage a docking connector or locking mechanism. To this end, a vertical docking apparatus includes a docking surface, a guide member extended from the docking surface, a plurality of locating members extending vertically from the docking surface, and a first connector on the docking surface. A docking member with a mating surface and a second connector on the mating surface is docked in the vertical docking apparatus by aligning the second connector with the first connector using the guide member and locating members and lowering the mating surface parallel to the docking surface, mating the second connector to the first connector.

A principal advantage of this embodiment is that it reduces the potential for damage to the docking member and docking member receiver during the docking and undocking process.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
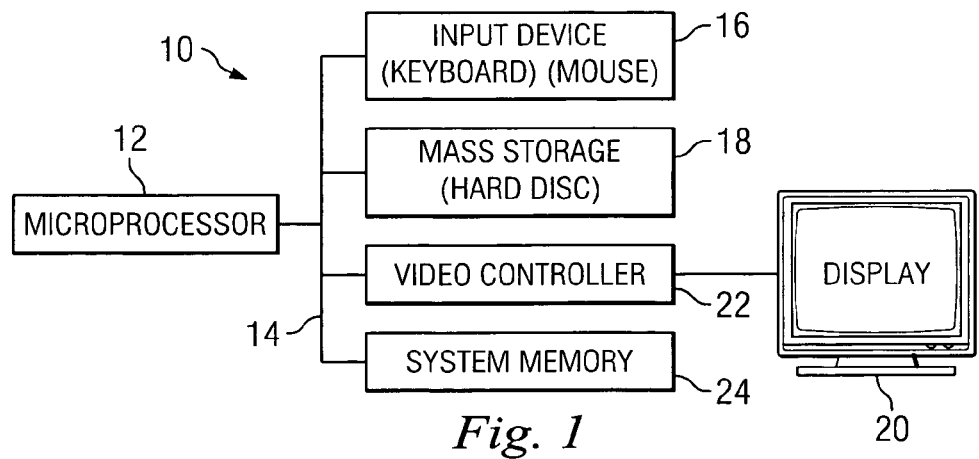
FIG. 1 is a diagrammatic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
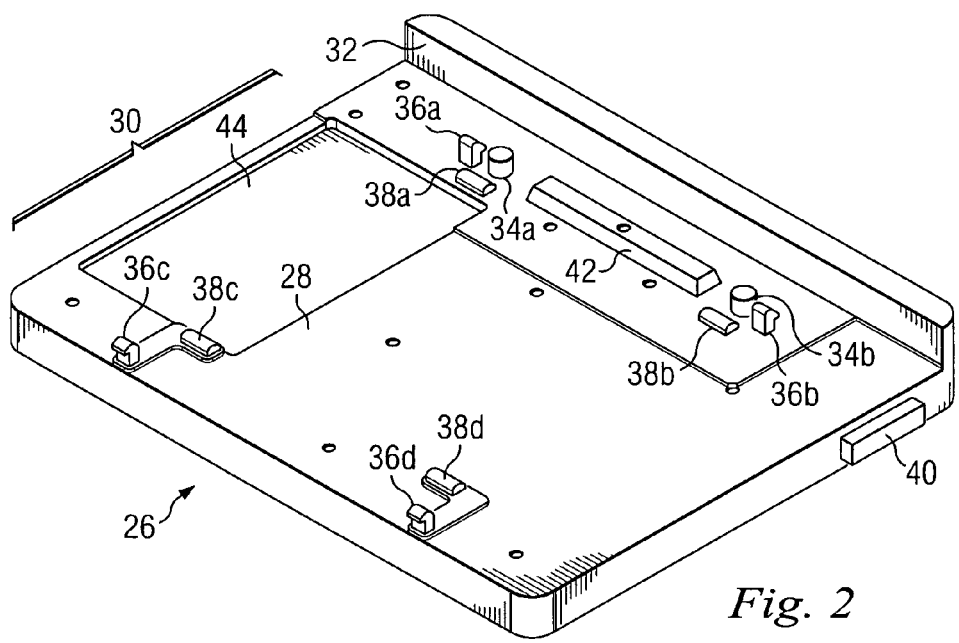
FIG. 2 is a perspective view illustrating an embodiment of a media slice with a battery in a cavity on the media slice.

A media slice 26, FIG. 2, supports several of the components of information handling system 10. Media slice 26 provides a docking surface 28. A cavity 30 is open to docking surface 28. A guide wall 32 extends from media slice 26, and provides an alignment means substantially perpendicular to docking surface 28. A plurality of locating members 34a and 34b extend vertically from docking surface 28 and also provide an alignment and leveling means. Locating members 34a and 34b are either formed of a strong material and/or provided with a sturdy shape, as they are likely to be subject to the most stress during the docking operation. A plurality of locking members 36a, 36b, 36c, and 36d extend from the docking surface and are moveable horizontally relative to docking surface 28 from a locked to an unlocked position. Locking members 36a and 36b are oriented opposite locking members 36c and 36d so that each group locks and unlocks by movement in opposite directions. A plurality of ejection members 38a, 38b, 38c, and 38d are movable in media slice 26, and are vertically extendable above docking surface 28. A ejection mechanism activator 40 is mounted on a surface of media slice 26, and is moveable to unlock locking members 36 and extend ejection members 38 above docking surface 28. A first connector 42 is mounted on docking surface 28 and is located in between locating members 34 in order to provide the maximum amount of position control around first connector 42 during the docking operation. A battery 44 may be stored and charged in cavity 30.

Figure 3:
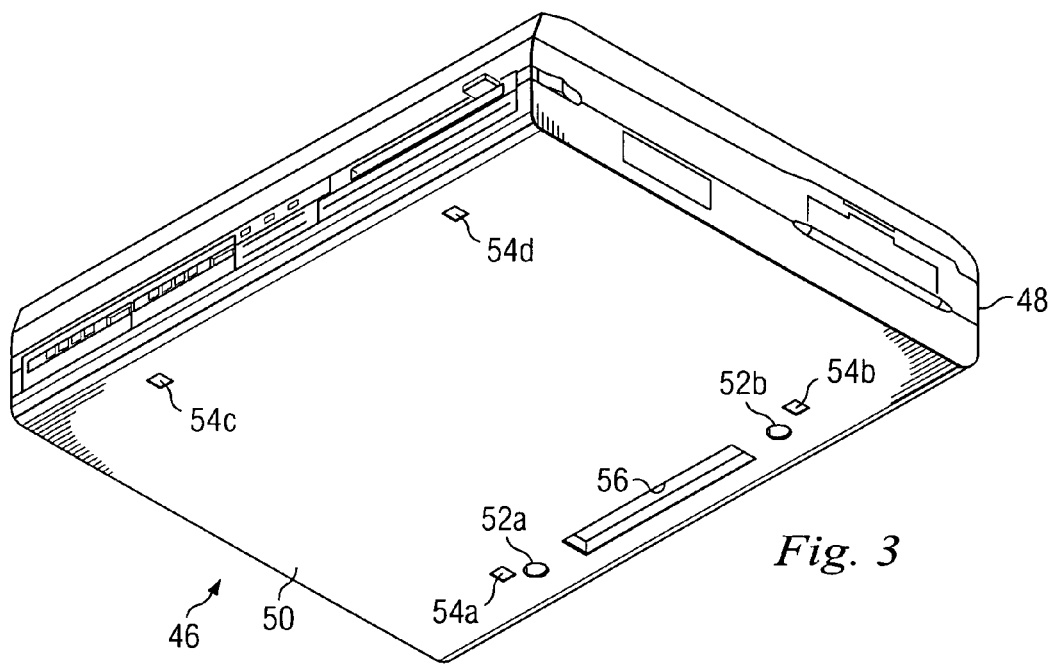
FIG. 3 is a perspective view illustrating an embodiment of an underside of a portable computer.

A portable computer 46, FIG. 3, is a type of information handling system that may be docked in media slice 26. A guide surface 48 is located at the rear of portable computer 46. A mating surface 50 is located on the bottom of portable computer 46. A plurality locating receivers 52a and 52b are provided on mating surface 50. Locating receivers 52 are cavities opening into mating surface 50. A plurality of locking member receivers 54a, 54b, 54c, 54d are provided on mating surface 50. Locking member receivers 54 are cavities opening into mating surface 50. A second connector 56 is mounted on mating surface 50 and located between locating receivers 52.

Figure 4:
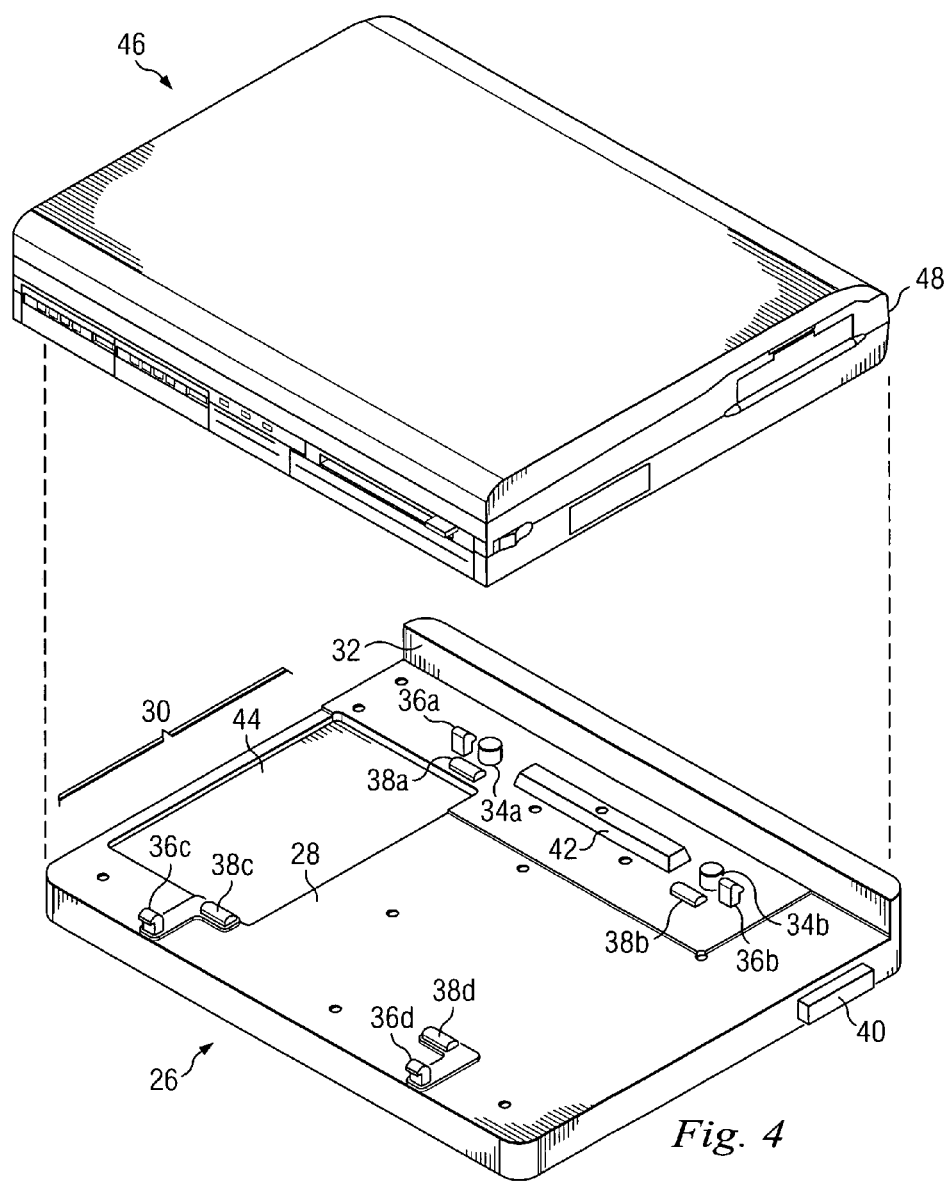
FIG. 4 is a perspective view illustrating an embodiment of the portable computer and the media slice with the battery in the cavity on the media slice.

In a docking operation, FIGS. 2, 3, and 4, guide surface 48 on portable computer 46 contacts guide wall 32 on media slice 26. Portable computer 46 is oriented above media slice 26 so that locating members 34a and 34b engage locating member receivers 52a and 52b with a substantially close tolerance permitting sliding engagement. Engagement of locating members 34a and 34b and locating member receivers 52a and 52b aligns first connector 42 and second connector 56, holds docking surface 28 substantially level and parallel to mating surface 50, and allows first connector 42 to be mated to second connector 56. Portable computer 46 is lowered onto media slice 26, extending the locating members 34a, 34b into receivers 52a, 52b, and engaging locking members 36a, 36b, 36c, and 36d with locking member receivers 54a, 54b, 54c, and 54d. Portable computer 46 is lowered further on locating members 34a, 34b, and first connector 42 engages second connector 56. Portable computer 46 is docked in media slice 26 when locking members 36a–d come to rest in locking member receivers 54a–d, with docking surface 28 and mating surface 50 engaged. First connector 42 and second connector 56 are now mated.

Figure 5:
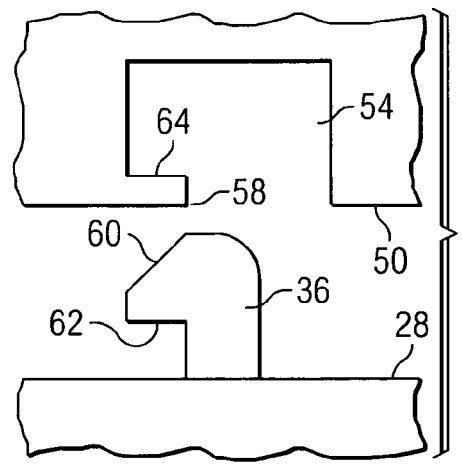
FIGS. 5 and 6 are side views illustrating a locking member and a locking member receiver in respective unlocked and locked positions.
Figure 6:
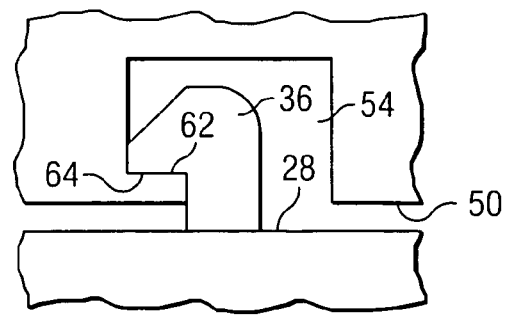

Engagement of locking members 36a–d with locking member receivers 54a–d, FIGS. 5 and 6, results in a receiver edge 58 guiding any one of the locking members 36a–d into a respective locking member receiver 54a–d, due to contact with a beveled locking member activation surface 60. Portable computer 46 is secured on media slice 26 when locking members 36a–d come to rest in locking member receivers 54a–d, and when a locking member retaining surface 62 engages with a locking member receiver retaining surface 64.

In an undocking operation, FIGS. 2, 3, and 4, ejection mechanism 40 is activated, which first releases locking members 36a–d from respective locking members receivers 54a–d. Then, ejection members 38 extend up out of docking surface 28 and come into contact with mating surface 50, raising portable computer 46 off media slice 26 while keeping docking surface 28 and mating surface 50 parallel by virtue of sliding engagement of locating members 34a, 34b and receivers 52a, 53b. Locking members 36a–d are released from locking member receivers 54a–d and first connector 42 is disengaged from second connector 56. Portable computer 46 may now be lifted off media slice 26.

When ejection mechanism 40 is activated, the position of locking members 36a–d are adjusted, FIGS. 5 and 6, so that locking member retaining surface 62 is no longer in contact with locking member receiver retaining surface 64. This allows disengagement of docking surface 28 and mating surface 50. Locking members 36a, 36b move in a direction opposite to the direction of movement of locking members 36c, 36d. The advantage of the opposite movement is as a security feature, given that disengagement of docking surface 28 from mating surface 50 without ejection mechanism 40 is difficult, as it requires the movement of the spaced apart locking members 36a, 36b in an opposite direction of the simultaneous movement of the spaced apart locking members 36c, 36d.

As can be seen, the principal advantages of these embodiments are that a portable computer is docked and undocked in a media slice while remaining parallel to the media slice. Docking and undocking in this manner results in less risk of damage to the docking components of the portable computer and the media slice. With the locking members oriented to function in a plurality of directions, a battery placed in a cavity in a media slice with a portable computer locked in the media slice is secure, given that to remove the portable computer from the media slice the locking members must be moved in different directions to allow the portable computer to be released.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A vertical docking apparatus comprising:
a docking receiver member having a docking surface, the docking receiver member including a battery cavity open to the docking surface;
a guide member extending vertically from an edge of the docking surface;
a plurality of elongated locating members extending vertically from the docking surface;
a first connector extending vertically from the docking surface;
a plurality of locking members mounted on the docking surface;
a plurality of locating receivers for receiving the locating members;
a docking member having a mating surface for engagement with the docking surface, the elongated locating members engaging the locating receivers positioned on the mating surface for maintaining the docking surface substantially parallel to the mating surface during a relative movement of the docking member and the docking receiver member;
a second connector extending vertically from the mating surface; and
a plurality of locking member receivers mounted on the mating surface, whereby primary engagement of the docking member with the guide member and secondary engagement of the of the locating members with the locating receivers aligns the first and second connectors for seating and for engagement of the locking members and the locking member receivers, the locking members being automatically simultaneously actuated by an ejection device for disengagement of the docking member and the docking receiver member; and
wherein at least one of the locking members is oriented to the function in a first direction and at least one of the locking members is oriented to the function in a second direction opposite the first direction so that a battery placed in the cavity is secured in the cavity due to the locking members moving in opposite directions to disengage the docking member and the docking receiver member.

2. The apparatus as defined in claim 1 wherein the docking receiver member is a media slice.

3. The apparatus as defined in claim 2 wherein the docking member is an information handling system.

4. The apparatus as defined in claim 1 further comprising:
a plurality of ejection members housed in the docking receiver member.

5. The apparatus as defined in claim 4 wherein the ejection device is located on the docking receiver member.

6. The apparatus as defined in claim 4 further comprising:
means on the docking member receiver for disengaging the locking members from the locking member receivers and extending the ejection members vertically from the docking surface.

7. The apparatus as defined in claim 1 further comprising:
a battery in the cavity.

8. The apparatus as defined in claim 1 further comprising:
means on the docking member receiver for locking the locking members in the locking members receivers.

9. An information handling system comprising:
a docking receiver member having a docking surface, the docking receiver member including a battery cavity open to the docking surface;
a guide member extending vertically from an edge of the docking surface;
a plurality of elongated locating members extending vertically from the docking surface;
a first connector extending vertically from the docking surface;
a plurality of locking members mounted on the docking surface;
a docking member including a chassis, a microprocessor in the chassis and a storage coupled to the microprocessor, the chassis having a mating surface for engagement with the docking surface;
a plurality of locating receivers on the mating surface for receiving the locating members, the elongated locating members engaging the locating receivers for maintaining the docking surface substantially parallel to the mating surface during a relative movement of the docking member and the docking receiver member;
a second connector extending vertically from the mating surface; and
a plurality of locking member receivers mounted on the mating surface, whereby primary engagement of the docking member with the guide member and secondary engagement of the of the locating members with the locating receivers aligns the first and second connectors for seating and for engagement of the locking members and the locking member receivers, the locking members being automatically simultaneously actuated by an ejection device for disengagement of the docking member and the docking receiver member; and
wherein at least one of the locking members is oriented to the function in a first direction and at least one of the locking members is oriented to the function in a second direction opposite the first direction so that a battery Placed in the cavity is secured in the cavity due to the locking members moving in opposite directions to disengage the docking member and the docking receiver member.

10. The system as defined in claim 9 wherein the docking receiver member is a media slice.

11. The system as defined in claim 10 wherein the docking member is a portable computer.

12. The system as defined in claim 9 further comprising:
a plurality of ejection members housed in the docking receiver member.

13. The system as defined in claim 12 wherein the ejection device is located on the docking receiver member.

14. The system as defined in claim 12 further comprising:
means on the docking receiver member for disengaging the locking members from the locking member receivers and extending the ejection members vertically from the docking surface.

15. The system as defined in claim 9 further comprising:
a battery in the cavity.

16. The system as defined in claim 9 further comprising:
means on the docking receiver member for locking the locking members in the locking members receivers.

17. A method for vertically docking an information handling system comprising:
providing a docking receiver member having a docking surface, the docking receiver member including a battery cavity open to the docking surface;
providing a guide member extending vertically from an edge of the docking surface;
providing a plurality of elongated locating members extending vertically from the docking surface;
providing a first connector extending vertically from the docking surface;

providing a plurality of locking members mounted on the docking surface;

providing a docking member having a chassis including a mating surface for engagement with the docking surface;

providing a plurality of locating receivers on the mating surface for receiving the locating members, providing the elongated locating members and the locating receivers with a structure sufficient for maintaining the docking and mating surfaces substantially parallel during a relative movement of the docking member and the docking receiver member;

providing a second connector extending vertically from the mating surface;

providing a plurality of locking member receivers mounted on the mating surface;

engaging the docking member with the guide member;

engaging the locating members with the locating receivers for aligning the first and second connectors;

engaging the locking members with the locking receivers; and connecting the first and second connectors;

providing an ejection device;

automatically simultaneously actuating the locking members by the ejection device for disengagement of the docking member from the docking receiver member; and wherein at least one of the locking members is oriented to the function in a first direction and at least one of the locking members is oriented to the function in a second direction opposite the first direction so that a battery placed in the cavity is secured in the cavity due to the locking members moving in opposite directions to disengage the docking member and the docking receiver member.

18. The method as defined in claim 17 wherein the locating members and locating member receivers provide means for maintaining the docking member substantially parallel to the docking receiver member during a vertical movement of the docking member.

* * * * *

UNITED STATES PATENT AND TRADEMARK OFFICE
CERTIFICATE OF CORRECTION

PATENT NO. : 7,085,132 B2 Page 1 of 1
APPLICATION NO. : 10/720713
DATED : August 1, 2006
INVENTOR(S) : Maria Schlesener et al.

It is certified that error appears in the above-identified patent and that said Letters Patent is hereby corrected as shown below:

Column 5, Line 26, after "engagement" delete "of the".

Column 6, Line 22, after "engagement" delete "of the".

Column 6, Line 33, delete "Placed" and insert --placed--.

Signed and Sealed this

Eleventh Day of September, 2007

JON W. DUDAS
*Director of the United States Patent and Trademark Office*